US010728775B2

(12) United States Patent
Savalle et al.

(10) Patent No.: US 10,728,775 B2
(45) Date of Patent: Jul. 28, 2020

(54) ROAMING AND TRANSITION PATTERNS CODING IN WIRELESS NETWORKS FOR COGNITIVE VISIBILITY

(71) Applicant: Cisco Technology, Inc., San Jose, CA (US)

(72) Inventors: Pierre-André Savalle, Rueil-Malmaison (FR); Grégory Mermoud, Veyras (CH); Jean-Philippe Vasseur, Saint Martin D'uriage (FR); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/406,535

(22) Filed: May 8, 2019

(65) Prior Publication Data
US 2019/0268784 A1    Aug. 29, 2019

Related U.S. Application Data

(63) Continuation of application No. 15/617,444, filed on Jun. 8, 2017, now Pat. No. 10,341,885.

(51) Int. Cl.
*H04W 24/02*    (2009.01)
*H04W 36/32*    (2009.01)
(Continued)

(52) U.S. Cl.
CPC ............ *H04W 24/02* (2013.01); *H04L 45/48* (2013.01); *H04W 36/00835* (2018.08);
(Continued)

(58) Field of Classification Search
CPC ............... H04W 84/12; H04W 24/02; H04W 36/00835; H04W 36/32; H04W 24/08;
(Continued)

(56) References Cited

U.S. PATENT DOCUMENTS 8,665,743 B2    3/2014  Zhu et al.
8,934,369 B2    1/2015  Cao et al.
(Continued)

OTHER PUBLICATIONS

Jain, et al., "Model T: An Empirical Model for User Registration Patterns in a Campus Wireless LAN", MobiCom '05 Proceedings of the 11th annual international conference on Mobile computing and networking, Cologne, Germany , Aug. 28-Sep. 2, 2005, pp. 170-184, 2005, ACM.
(Continued)

*Primary Examiner* — Rownak Islam
(74) *Attorney, Agent, or Firm* — Behmke Innovation Group LLC; James M. Behmke; Jonathon P. Western

(57) ABSTRACT

In one embodiment, a device receives data regarding usage of access points in a network by a plurality of clients in the network. The device maintains an access point graph that represents the access points in the network as vertices of the access point graph. The device generates, for each of the plurality of clients, client trajectories as trajectory subgraphs of the access point graph. A particular client trajectory for a particular client comprises a set of edges between a subset of the vertices of the access point graph and represents transitions between access points in the network performed by the particular client. The device identifies a transition pattern from the client trajectories by deconstructing the trajectory subgraphs. The device uses the identified transition pattern to effect a configuration change in the network.

20 Claims, 7 Drawing Sheets

(51) Int. Cl.
*H04W 64/00* (2009.01)
*H04W 36/00* (2009.01)
*H04L 12/753* (2013.01)
*H04W 40/22* (2009.01)
*H04W 84/12* (2009.01)
*H04W 36/30* (2009.01)

(52) U.S. Cl.
CPC ........... *H04W 36/32* (2013.01); *H04W 40/22* (2013.01); *H04W 64/00* (2013.01); *H04W 64/003* (2013.01); *H04W 36/30* (2013.01); *H04W 84/12* (2013.01)

(58) Field of Classification Search
CPC ... H04W 36/30; H04W 64/00; H04W 64/003; H04W 40/22; H04L 45/48
USPC ......................................................... 370/254
See application file for complete search history.

(56) References Cited

U.S. PATENT DOCUMENTS

| | | | |
|---|---|---|---|
| 8,982,732 | B2 | 3/2015 | Balasubarmaniyan et al. |
| 9,736,699 | B1 | 8/2017 | Rao |
| 2003/0169684 | A1* | 9/2003 | Yamanaka ......... H04Q 11/0062 370/216 |
| 2014/0098682 | A1 | 4/2014 | Cao |
| 2014/0105195 | A1 | 4/2014 | Balasubarmaniyan |
| 2015/0205450 | A1 | 7/2015 | Howett |
| 2015/0319660 | A1 | 11/2015 | Helbert |
| 2015/0382148 | A1 | 12/2015 | Agarwal |
| 2016/0219462 | A1* | 7/2016 | Anderson ............. H04W 28/20 |
| 2016/0249242 | A1 | 8/2016 | Okita |
| 2017/0331694 | A1* | 11/2017 | Crickett .............. H04L 41/0836 |
| 2018/0081880 | A1 | 3/2018 | Kennedy |

OTHER PUBLICATIONS

Samatova, N., "Frequent Subgraph Mining", WWW internet site https://www.csc2.ncsu.edu/faculty/nfsamato/practical-graph-mining-with-R/slides/pdf/Frequent_Subgraph_Mining.pdf, printed Jun. 2017, 75 pages, North Carolina State University.

Sofia, Rute., "A Tool to Estimate Roaming Behavior in Wireless Architectures", WWIC2015 Proceedings, 13 pages, Aug. 23, 2015, Springer.

\* cited by examiner

ROAMING AND TRANSITION PATTERNS CODING IN WIRELESS NETWORKS FOR COGNITIVE VISIBILITY

RELATED APPLICATION

The present application is a Continuation Application of U.S. patent application Ser. No. 15/617,444, filed on Jun. 8, 2017, entitled ROAMING AND TRANSITION PATTERNS CODING IN WIRELESS NETWORKS FOR COGNITIVE VISIBILITY, by Pierre-André Savalle et al., the contents of which is hereby incorporated by reference.

TECHNICAL FIELD

The present disclosure relates generally to computer networks, and, more particularly, to roaming and transition patterns coding in wireless networks for cognitive visibility.

BACKGROUND

Many wireless networks include a large number of wireless controllers, access points (APs), and wireless clients (e.g., wireless devices that connect to the network). During operation, a wireless client may transition from one wireless AP to another, such as when the client physically moves from one location to another. For example, a user's mobile phone may transition from being attached to a first network AP to being attached to a second network AP, as the user moves throughout a building. Other reasons for AP transitions can also include problems such as poor radio reception (e.g., a client attaches to the second AP because of poor radio performance exhibited by the first AP).

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
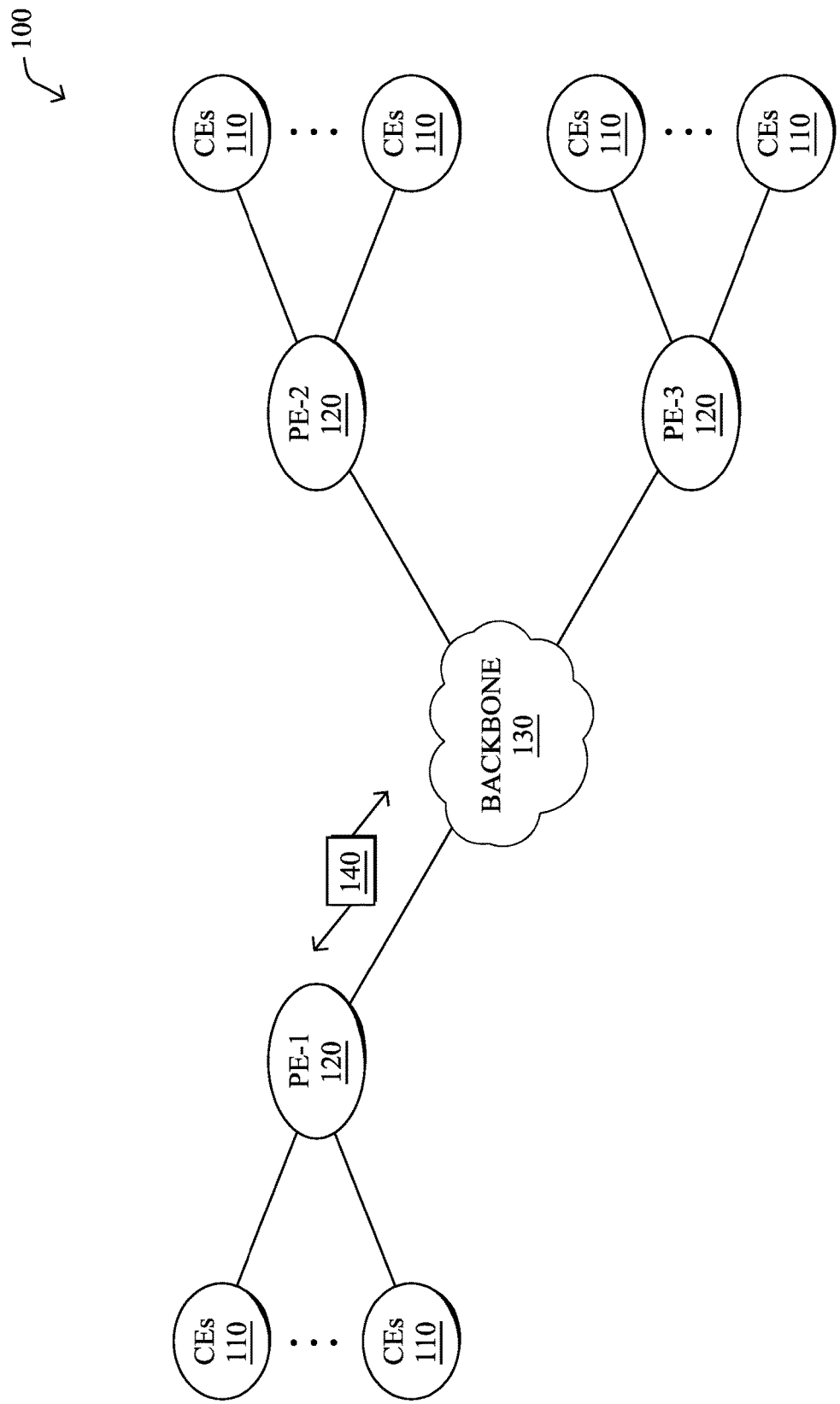
FIGS. 1A-1B illustrate an example communication network.

According to one or more embodiments of the disclosure, a device receives data regarding usage of access points in a network by a plurality of clients in the network. The device maintains an access point graph that represents the access points in the network as vertices of the access point graph. The device generates, for each of the plurality of clients, client trajectories as trajectory subgraphs of the access point graph. A particular client trajectory for a particular client comprises a set of edges between a subset of the vertices of the access point graph and represents transitions between access points in the network performed by the particular client. The device identifies a transition pattern from the client trajectories by deconstructing the trajectory subgraphs. The device uses the identified transition pattern to effect a configuration change in the network.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
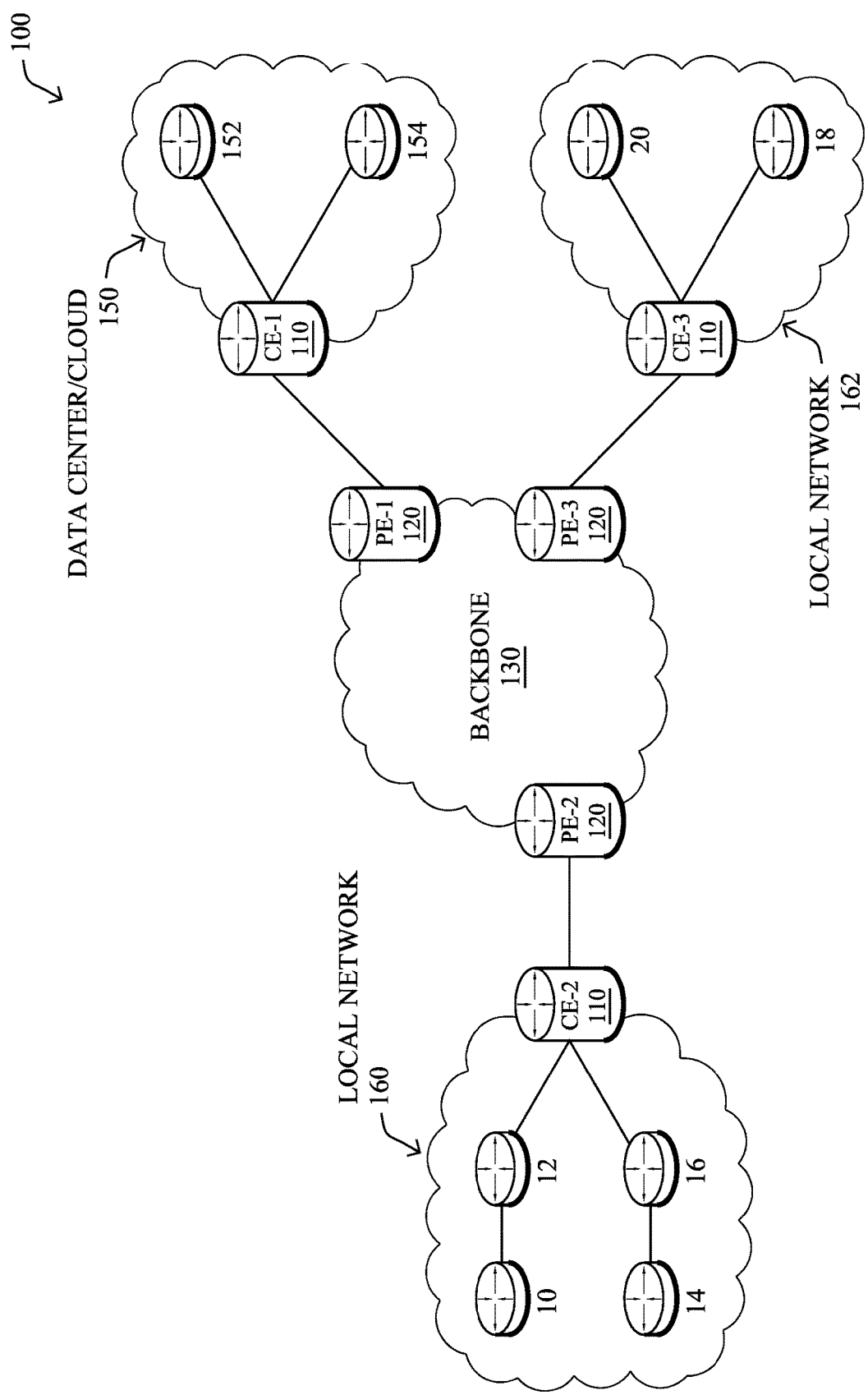

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
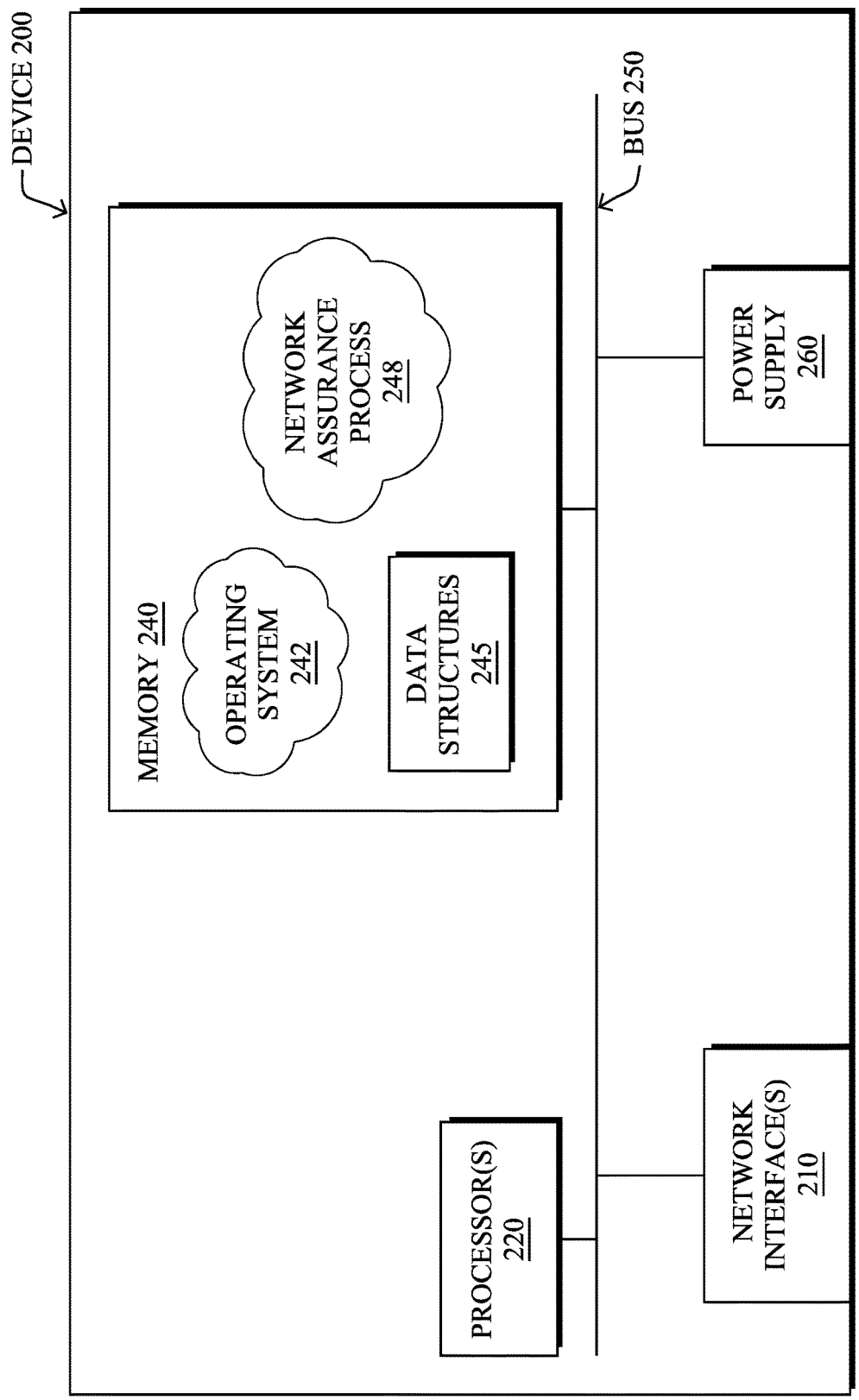
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
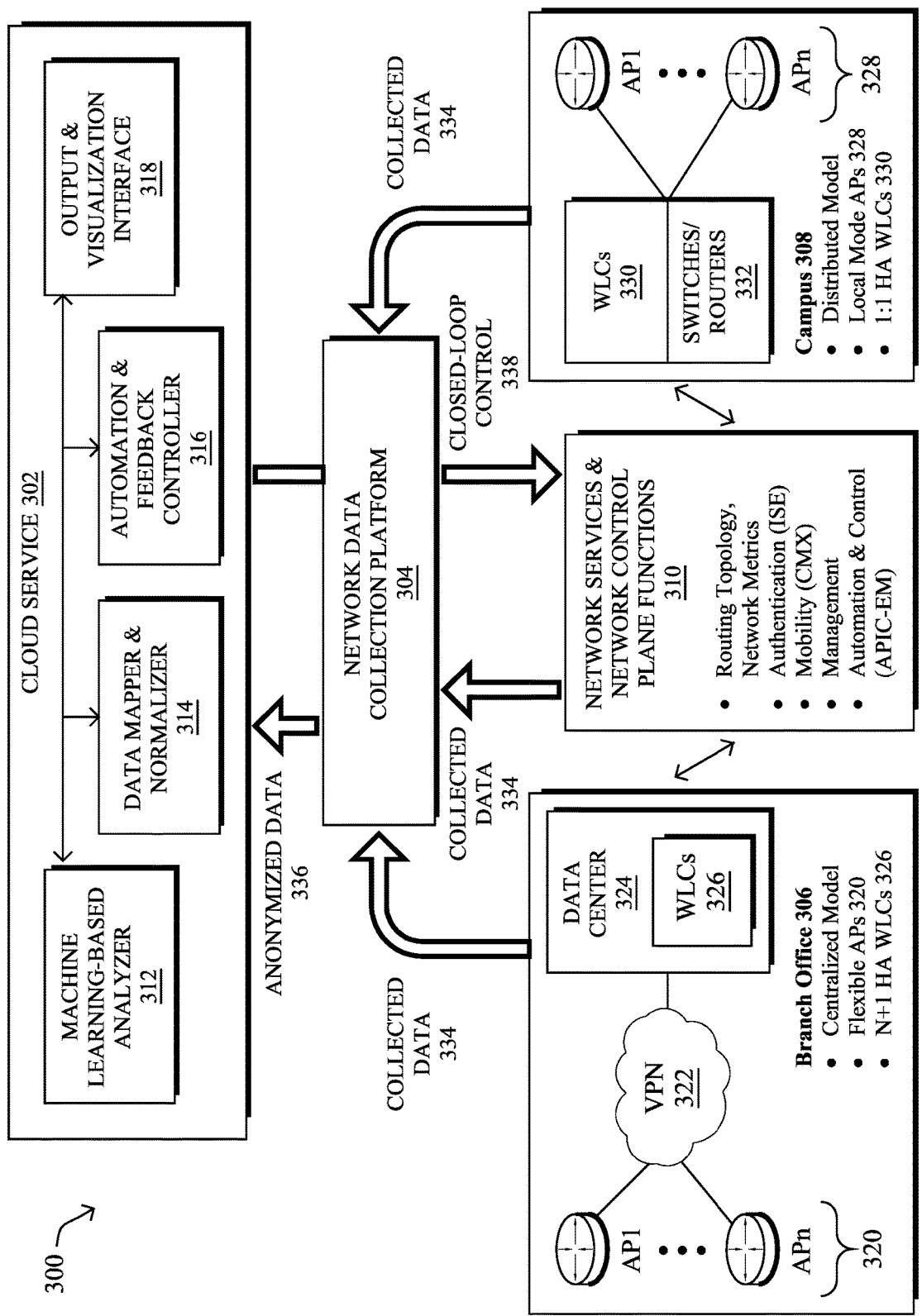
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point API through nth access point, APn) through which endpoint nodes may connect. Access points 320 may, in turn, be in communication with any number of wireless LAN controllers (WLCs) 326 located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point API through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and the like. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong"

clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint device, networking device in branch office 306 or campus 308, or a network service or control plane function 310, to adjust its operations (e.g., by signaling an endpoint to use a particular AP 320 or 328, etc.).

As noted above, there are various reasons for a client to transition from one AP to another in the network. These include, for example, physical movement of the client, changing environmental conditions (e.g., closed doors, etc.), device malfunctions, network policies (e.g., to force certain clients to attach to certain APs), misconfigurations, and the like. From a network assurance standpoint, insight into these AP transitions can be used to infer dependencies between entities, produce forecasting models, and/or detect anomalies. In addition, greater insight into the AP transitions occurring in a network can be used by an administrator to better understand the network, which is referred to herein as "cognitive visibility."

One key insight that may be of interest is how users roam or transition from one AP to another within the network. When physical locations of APs are known, this provides insights as to what paths the users take within a building, possibly revealing different AP profiles such as transitory APs in places people mostly stroll by, and APs corresponding to more stationary behaviors. In addition to this, analysis of small parts of full user trajectories may provide additional insights as to how users locally switch between APs. These local patterns can be crucial in diagnosing a wide range of issues such as clients continuously alternating back and forth between two or more APs ("flip-flopping"), clients actually being too sticky to a single AP although radio or performance metrics are not acceptable, and the like. These local patterns can also reveal AP transition paths that are over used or under used.

The local AP transition patterns may also be used outside of performance diagnostics. For example, in environments such as retail or public venues that do not necessarily have precise spatial localization technologies such as hyper-location, these local patterns can provide further insights as to how clients move from one area to another.

Roaming and Transition Pattern Coding in Wireless Networks for Cognitive Visibility The techniques herein allow a network assurance system to derive insights from the automated analysis of client transitions between APs in a wireless network. In some aspects, the APs may be represented as vertices of an AP graph and client trajectories defined via subgraphs of the AP graph (e.g., by representing a transition as a directed graph edge between AP vertices). In further aspects, decomposition of these subgraphs can be used to identify AP transition patterns, which can be used for both user analytics and for diagnostics of the wireless network.

Specifically, according to one or more embodiments of the disclosure as described in detail below, a device receives data regarding usage of access points in a network by a plurality of clients in the network. The device maintains an access point graph that represents the access points in the network as vertices of the access point graph. The device generates, for each of the plurality of clients, client trajectories as trajectory subgraphs of the access point graph. A particular client trajectory for a particular client comprises a set of edges between a subset of the vertices of the access point graph and represents transitions between access points in the network performed by the particular client. The device identifies a transition pattern from the client trajectories by deconstructing the trajectory subgraphs. The device uses the identified transition pattern to effect a configuration change in the network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
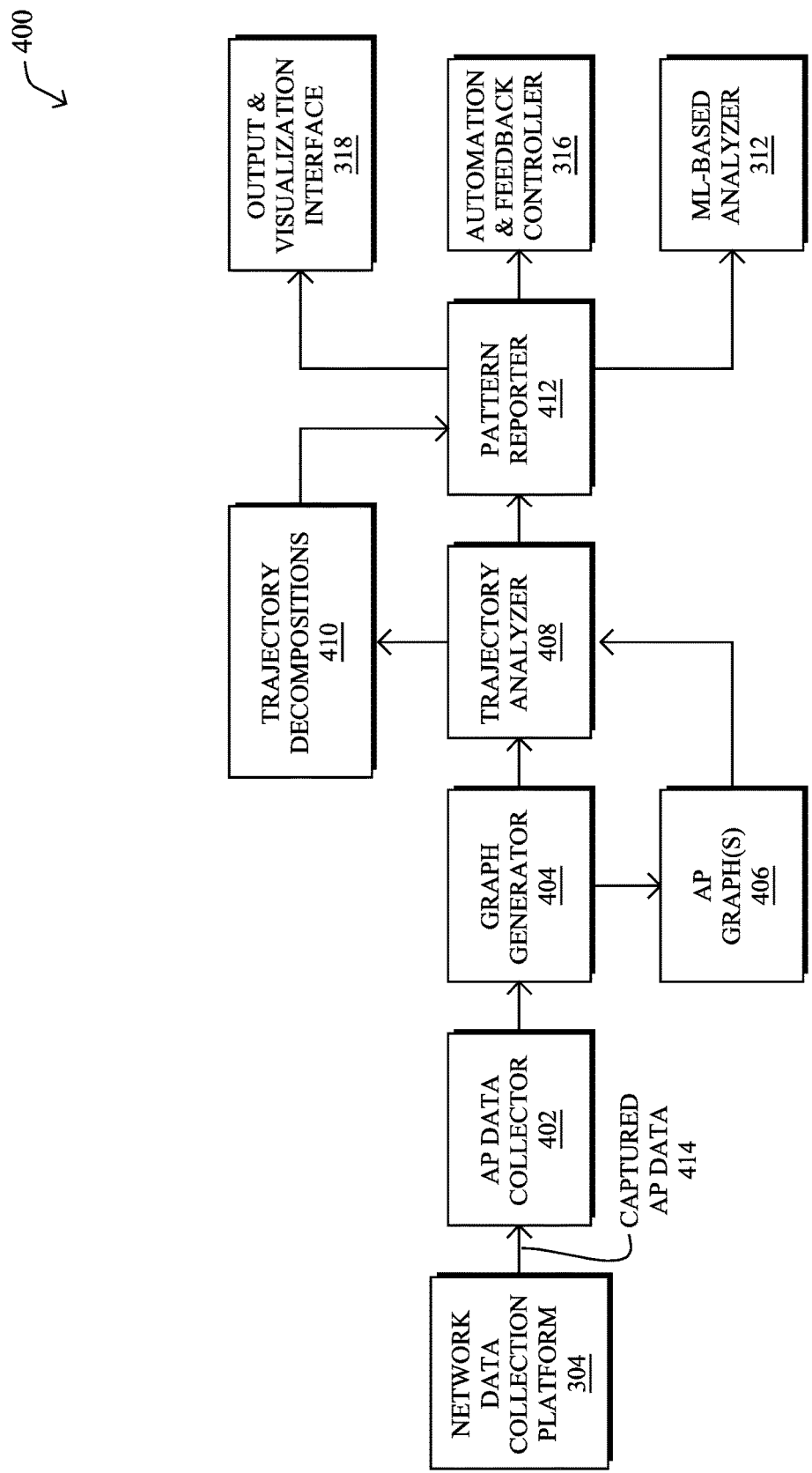
FIG. 4 illustrates an example architecture for identifying access point transition patterns.

Operationally, FIG. 4 illustrates an example architecture 400 for the automatic assessment of client transitions between access points (AP) in a network. As shown, architecture 400 may include any or all of the following components: an AP data collector 402, an AP graph generator 404, one or more AP graphs 406, a trajectory analyzer 408, trajectory decompositions 410, and/or a pattern reporter 412.

In various embodiments, the components of architecture 400 may be implemented within a network assurance system, such as system 300 shown in FIG. 3. For example, AP data collector 402 may receive captured AP data from network data collection platform 304. In addition, pattern reporter 412 may report identified AP transition patterns to output and visualization interface 318, automation & feedback controller 316, and/or to machine learning (ML)-based analyzer 312. Thus, in some embodiments, components 402-412 may be implemented as part of cloud service 302. However, in further embodiments, components 402-412 may be distributed across any of the different layers of network assurance system 300 (e.g., within network data collection platform 304, etc.). In further embodiments, components 402-412 of architecture 400 may be implemented as its own stand-alone service, either as part of the local network under observation or as a remote service.

As used herein, a "trajectory" of a network client generally refers to the set of AP transitions exhibited by the client during use of the network. For instance, a trajectory may be defined as the sequence of AP changes until a point where the client is not seen in the network at any AP for a specified duration. In other words, a start of a trajectory may correspond to the first AP to which the client attached and an end of the trajectory may correspond to an access point transition by the client for which a subsequent access point transition is not observed within a predefined amount of time.

Note that the bounds for a client trajectory in a network may be difficult to tune correctly. More specifically, ending trajectories after a small timeout may lead to many small fragmented trajectories, especially in the presence of dead zones (e.g., elevators, or actual on-floor dead zones). On the other hand, ending trajectories after a long timeout may lead to trajectories that contain transitions that are physically implausible. In addition, the length of trajectories may vary greatly, resulting in a very heterogeneous set of sequences. Finally, the analysis of local patterns requires an analysis to be performed at a finer granularity than full trajectories. Based on initial testing, a time threshold of several hours (e.g., two, three, four, five, six, etc.) for the trajectories provides a sufficient tradeoff.

As shown, AP data collector 402 may receive captured AP data 414 from network data collection platform 304, either on a push or pull basis. For example, whenever an AP transition is detected for a given client (e.g., L2 or L3 roaming), network data collection platform 304 may report such a transition to AP data collector 402 as part of captured AP data 414. In various embodiments, captured AP data 414 may include any or all of the following information:

An identifier for an AP in the network
An identifier for a particular client
An indication of an AP event associated with the identified client, such as the client newly joining the AP, the client transitioning to or from the identified AP (e.g., L2 or L3 roaming events), etc.
A timestamp for the indicated transition
Status information for the AP, such as information regarding connected clients, traffic send via the AP, signal information for the AP, etc.

In one embodiment, AP data 414 may only report AP events where a client joins a new AP. In another embodiment, this can be restricted to roaming events, where a wireless roaming has taken place (e.g., L2 or L3 roaming). This second embodiment allows the network assurance system to focus specifically on roaming patterns, which can be useful for diagnostics.

In various embodiments, graph generator 404 may generate one or more AP graphs 406, based on the AP data 414 obtained by AP data collector 402. In general, an AP graph 406 may represent APs in the monitored network as graph vertices and client transitions between APs as edges between the graph vertices in AP graph 406. Notably, AP graph 406 may be a sparse graph of all possible AP transitions in the network. For example, a client transition from an AP 'A' to an AP 'B' in the network may be represented in graph form as an edge between graph vertices that represent APs 'A' and 'B,' respectively. Depending on the objective, the AP graph 406 can be a directed graph (e.g., with transitions/edges having an associated direction) or an undirected graph.

In some cases, graph generator 404 may generate AP graph 406 based on historically observed transitions between APs. In further cases, graph generator 404 can create AP graph 406 using external information about the physical locations of the APs. For instance, a large network with one hundred physical building locations, each having approximately one hundred APs, can be associated with a graph by using the complete graph in each physical location and no edge between locations. This would result in an AP graph 406 of one million edges, which can be very large for dictionary learning. However, note that because all physical locations are independent, these can be treated separately as low to medium dimension problems (e.g., as separate AP graphs 406). All these more manageable problems can be treated in parallel.

In various embodiments, graph generator 404 may represent each trajectory from captured AP data 414 as a subgraph of the supporting AP graph 406. A simplified example AP graph 500 is shown in FIG. 5, to illustrate the representation of APs and trajectories in graph form.

Figure 5:
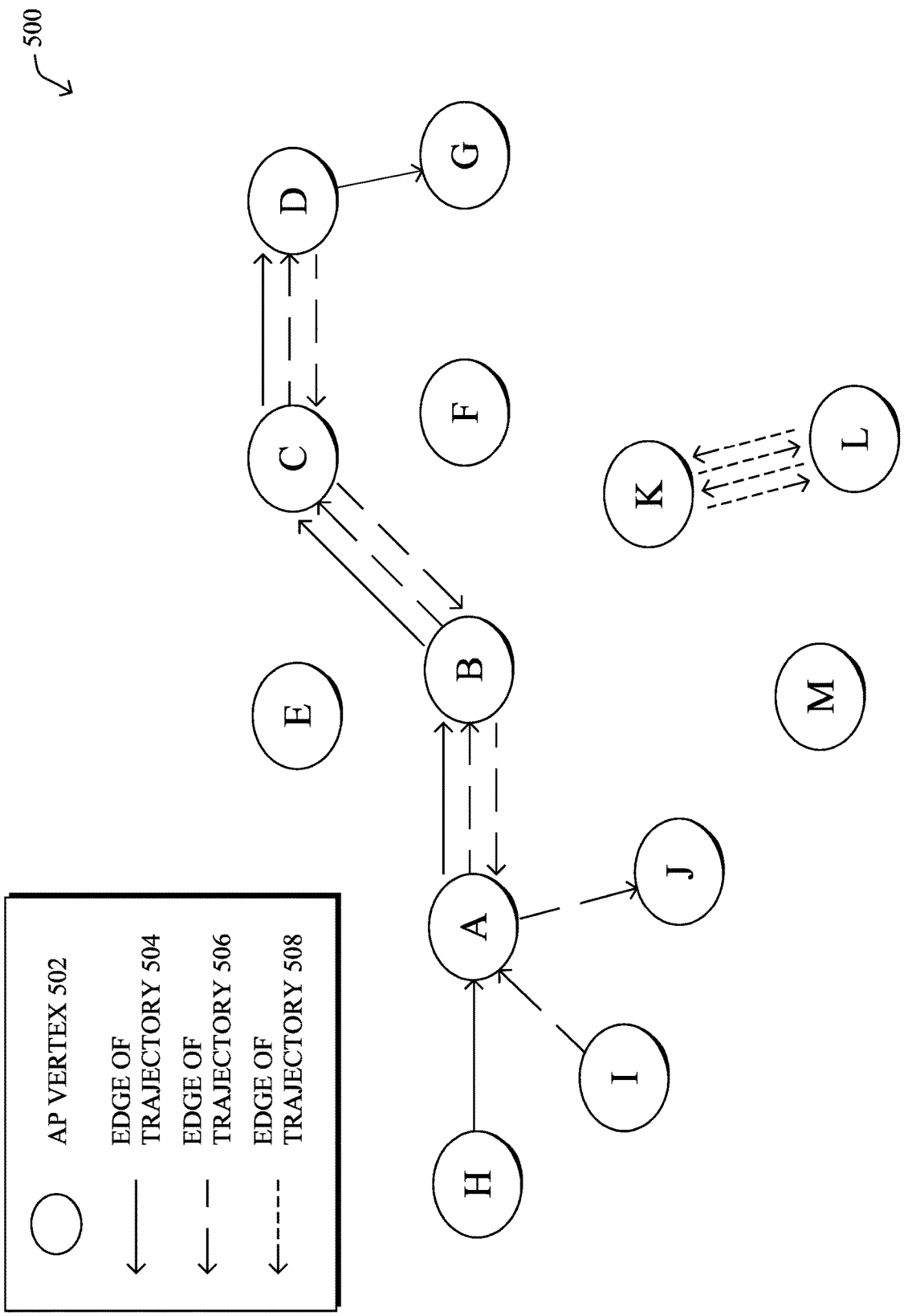
FIG. 5 illustrates an example access point graph and client trajectories.

As shown in FIG. 5, assume that the monitored network has as set of APs denoted A-M. In such a case, each of the APs can be represented in AP graph 500 as an AP vertex 502. For purposes of readability, graph edges that represent potential AP transitions are omitted from AP graph 500 shown.

Also as shown in FIG. 5, assume that there are three different clients in the network that each attach to different sets of APs. To represent the trajectories of these clients, each client may be associated with different edges between vertices 502. For example, a first client may have a trajectory with edges 502 that form a graph path of H→A→B→C→D→G within a subgraph of graph 500 that only includes vertices 502 that represent the set of APs {A, B, C, D, G, H}. Similarly, a second client may have a trajectory with edges 504 that form a graph path of I→A→B→C→D→C→B→A→J within a subgraph of graph 500 that comprises vertices 502 that represent the set of APs {A, B, C, D, I, J}. Finally, a third client may have a trajectory with edges 506 that form a graph path of K→L→K→L as part of a subgraph of graph 500 that represent the set of APs {K, L}.

Referring again to FIG. 4, trajectory analyzer 408 may analyze the trajectories represented in AP graph(s) 406 by decomposing the subgraphs/sets of trajectories into trajectory decompositions 410 using very small connected subgraphs. In turn, pattern reporter 412 may effect a configuration change in the network based on an identified transition pattern. For example, pattern reporter 412 may report any identified patterns from trajectory decompositions 410 to output & visualization interface 318 (e.g., to provide data regarding an identified transition pattern to an administrator that implements the change). In a further case, pattern reporter 412 may report an identified transition pattern to automation & feedback controller 316, to automatically change the network configuration. In a further embodiment, pattern reporter 412 may provide the transition pattern information to ML-based analyzer 312, to detect anomalies.

In some embodiments, a trajectory pattern can be identified by using sparse coding/dictionary learning. In such cases, trajectory analyzer 408 may represent the trajectory edges in AP graph(s) 406 as entries in feature vectors of a feature matrix. For example, each entry in a feature vector may represent a potential AP transition and trajectory analyzer 408 may assign non-zero values to the entries that represent actual transitions for a given client within the trajectory. In one embodiment, binary indicators can be used whereby '1' indicates an observed AP transition and '0' indicates an unobserved transition. Alternatively, trajectory analyzer 408 may assign real-valued weights to the feature vector entries to reflect the transition strength of interest to the analyst or system. Examples of weightings include the amount of times a given transition was observed in the trajectory, importance weights based on the amount of traffic at the two endpoint APs, etc.

Based on the feature vectors, trajectory analyzer 408 may form trajectory decompositions 410 as dictionary code words, in accordance with sparse coding/dictionary learning techniques. For example, code words can be constrained to include only contiguous transitions, such as A→B, B→C, and so on. This requirement is important for interpretability of the resulting code words. In practice, this can also be achieved through additional hard constraints on dictionary learning, or by imposing a significant penalty, such as a special crafted fused Lasso penalty. In addition, code words including non-contiguous transitions can be pruned out after each iteration of the dictionary learning, before coding.

In another embodiment, trajectory analyzer 408 may form the trajectory decompositions 410 using a frequent subgraph mining approach. In general, frequent subgraph mining refers to a class of techniques that attempt to discover graph structures that frequently occur across a set of graphs. Here, trajectory analyzer 408 may analyze the trajectory subgraphs, to identify the graph structures in common across the different trajectories. Although all variants of frequent subgraph mining are NP-hard, many heuristics and approximate approaches exist. For instance, trajectory analyzer 408 may employ gSpan, SUBDUE, SLEUTH, or another such frequent subgraph mining approach, to identify common graph structures across the trajectories.

In both cases of using either sparse coding/dictionary learning or frequent subgraph mining, the goal of trajectory analyzer 408 is to have a shared and limited size set of subgraphs that can be used to decompose most trajectories. This means that very rare patterns will not be modeled. In practice, one may want to reweight the loss in sparse coding or in frequent subgraph mining based on various importance patterns, to correct for potential biases in the data.

Note that there is an important difference between the two proposed ways of decomposing the trajectories. Depending on the application, one or the other may be more relevant, and both types of information may actually be computed in parallel and provided, in further embodiments. In particular, if sparse coding/dictionary learning is used, the patterns are specific to the actual identity of the APs. For instance, from the trajectories represented in FIG. 5, trajectory analyzer 408 may learn a code word for transitions A→B, B→C, C→D, since two of the trajectories include these graph portions. On the other hand, frequent subgraph mining can learn "movable" graph patterns that can be used everywhere in the trajectories. In the same example, trajectory analyzer 408 might ". - - - . - - - . - - - ." where dots indicate graph nodes and dashes represent graph edges. Some variants of frequent subgraph mining can further handle node identity to provide an output closer to that of sparse coding.

Pattern reporter 412 may assess the identified transition patterns and further report on any corresponding network conditions that may exist. In other words, pattern reporter 412 may make inferences regarding the identified transition patterns observed in the network. For example, again referring to FIG. 5, the trajectory between the vertices 502 representing APs 'K' and 'L' may indicate a flip-flopping condition that may be resolved, for example, by changing the network configuration to 'pin' one or more clients to either 'K' or 'L.'

In another example of the use of the analyzed trajectories, note that the vertex 502 that represents AP 'E' in graph 500 is systematically bypassed by the trajectories shown. This may provide insight into the operation of the network, such as AP 'E' being subject to an occlusion condition or otherwise experiencing a radio condition that causes the AP to be under-utilized. Here, the multi-step code words in the trajectory decompositions can be used to identify such a condition, such as when transitions frequently occur between physically far away APs (e.g., A→B is often observed, despite A→E being physically shorter).

By extension, code words that are chunks of trajectories can also be useful for determining why some APs are popular and some are not. This can be used, either through visual inspection or using some heuristics, to interpret the code words. As would be appreciated, the use cases herein are provided for illustrative purposes only and are not intended to be limiting.

During operation, a full fit of decomposition models may be performed from time to time, in an attempt to iteratively update the models. Further the coding of currently open trajectories may be re-evaluated when indications of new AP changes are received. In one embodiment, pattern reporter 412 may export raw coding results which can be consumed by other systems. For example, in retail or public venues, this can be used by data analysts to gain insight about user behaviors. In another embodiment, pattern reporter 412 can directly provide analytics to network administrators for performance analysis and troubleshooting. This can include general description of the local pattern dictionary and most common pattern occurrences from trajectory decompositions 412, but also more detailed analysis modules such as detection, diagnostics and root cause analysis (e.g., for "flip-flopping" issues, etc.).

To ensure user privacy, the system may further prune any personally-identifiable information during use, so as not to actually record the movement of users. For example, client identifiers may be anonymized for purposes of tracking client trajectories in the network. Further, as recurring transition patterns are typically the most insightful, the system may be agnostic to the trajectories of an individual, instead focusing on what actual transition patterns are seen in the network.

Figure 6:
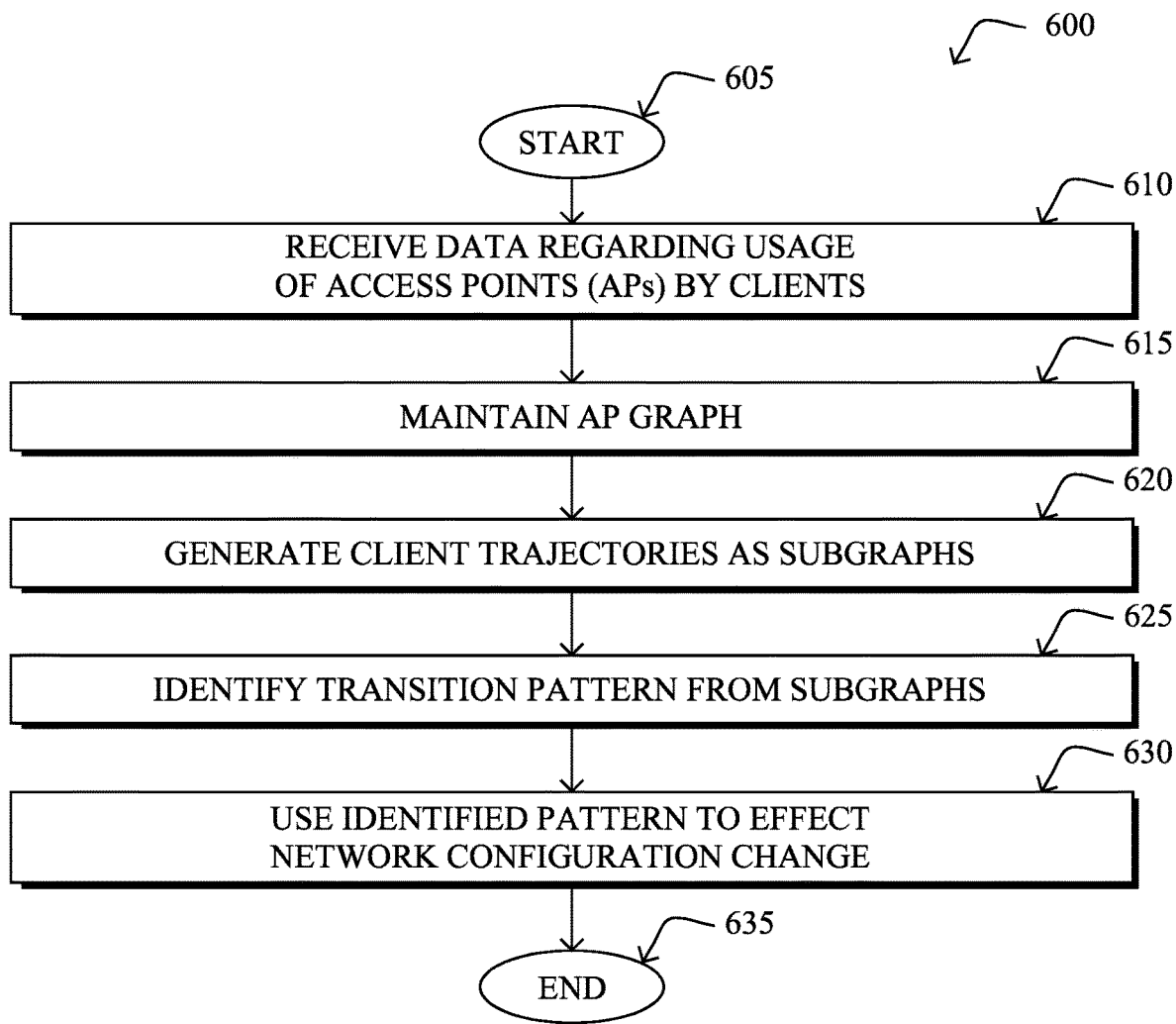
FIG. 6 illustrates an example simplified procedure for assessing access point transitions by clients in a network.

FIG. 6 illustrates an example simplified procedure for assessing access point transitions by clients in a network, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may receive data regarding AP usage by clients in a network. Such data may indicate, for example, when a given client attaches to a given AP, transitions of a client between APs, etc.

At step 615, as detailed above, the device may maintain an AP graph that represents the APs in the network. In various embodiments, each AP in the network may be represented within the graph as a graph vertex. The layout of these vertices may also be determined based on the physical locations of the APs in the network and/or on previously observed AP transitions between the APs. For example, if it is known that APs 'A' and 'B' are physically next to one another in the network, the graph layout may reflect this relationship by making their corresponding vertices also neighboring.

At step 620, the device may generate, for each of the plurality of clients, client trajectories as trajectory subgraphs of the AP graph, as described in greater detail above. In various embodiments, a particular client trajectory for a particular client may comprise a set of edges between a subset of the vertices of the access point graph and represents transitions between access points in the network performed by the particular client. For example, if a given client alternates between being connected to APs 'A' and 'B' its trajectory may be represented graphically as a set of edges A→B→A→B.

At step 625, as detailed above, the device may identify a transition pattern from the client trajectories by decomposing the trajectory subgraphs. Such decompositions may, for example, correspond to overlapping sub-portions of the trajectory subgraphs, thereby indicating behavioral patterns among the transitions observed in the network. In some embodiments, the device may perform the decompositions using a sparse coding/dictionary learning approach by representing the transitions as feature vectors and the decompositions as code words. In further embodiments, the device may perform the decompositions using a frequent subgraph mining approach.

At step 630, the device may use the identified transition pattern to effect a configuration change in the network. In some embodiments, this may entail the device providing an indication of the pattern to a user interface, such as for review by an administrator that initiates corrective changes in the network. In another embodiment, this may entail the device providing an indication of the pattern to an anomaly detector or a controller, to automatically implement the necessary change. By way of example, if the pattern indicates a client alternating between one or more APs (e.g., a flip-flopping condition), the change may fix the client to one of the APs. In another example, if the pattern indicates that an AP is subject to an occlusion condition, the change may be to relocate the AP, etc. Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the capturing of insights from observed AP transitions in a monitored network. Such insights can be used to determine user patterns, as well as diagnose network issues or conditions.

While there have been shown and described illustrative embodiments that provide for identifying AP transition patterns in a network, it is to be understood that various other adaptations and modifications may be made within the spirit and scope of the embodiments herein. For example, while certain embodiments are described herein with respect to using certain trajectory decomposition approaches, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device, data regarding usage of access points in a network by a plurality of clients in the network;
maintaining, by the device, an access point graph based on the data regarding usage of access points, wherein the access point graph represents the access points in the network as vertices of the access point graph;
generating, by the device and for each of the plurality of clients, client trajectories as trajectory subgraphs of the access point graph, wherein a particular client trajectory for a particular client comprises a set of edges between a subset of the vertices of the access point graph and represents transitions between access points in the network performed by the particular client;
identifying, by the device, a transition pattern from the client trajectories by deconstructing the trajectory subgraphs, wherein the identified transition pattern indicates that a particular access point is underutilized due to an occlusion condition; and
using, by the device, the identified transition pattern to effect a configuration change in the network that removes the occlusion condition.

2. The method as in claim 1, wherein using the identified transition pattern to effect a configuration change in the network comprises:
providing, by the device, an indication of the identified transition pattern to a user interface.

3. The method as in claim 1, wherein identifying the transition pattern from the client trajectories by deconstructing the trajectory subgraphs comprises:
performing, by the device, frequent subgraph mining on the subgraphs, to identify the transition pattern.

4. The method as in claim 1, wherein identifying the transition pattern from the client trajectories by deconstructing the trajectory subgraphs comprises:
representing, by the device, the edges of the subgraphs as entries in feature vectors for the trajectories; and
applying, by the device, dictionary learning to the feature vector entries for the trajectories, to identify the transition pattern.

5. The method as in claim 4, further comprising:
applying, by the device, a weighting to the feature vector entries to emphasize transitions of interest.

6. The method as in claim 1, wherein using the identified transition pattern to effect a configuration change in the network comprises:
providing, by the device, an indication of the identified transition pattern to a machine learning-based anomaly detector.

7. The method as in claim 1, wherein an end of a trajectory corresponds to an access point transition by a client for which a subsequent access point transition is not observed within a predefined amount of time.

8. An apparatus comprising:
one or more network interfaces to communicate with a network;
a processor coupled to the network interfaces and configured to execute one or more processes; and
a memory configured to store a process executable by the processor, the process when executed configured to:
receive data regarding usage of access points in a network by a plurality of clients in the network;
maintain an access point graph based on the data regarding usage of access points, wherein the access point graph represents the access points in the network as vertices of the access point graph;
generate, for each of the plurality of clients, client trajectories as trajectory subgraphs of the access point graph, wherein a particular client trajectory for a particular client comprises a set of edges between a subset of the vertices of the access point graph and represents transitions between access points in the network performed by the particular client;
identify a transition pattern from the client trajectories by deconstructing the trajectory subgraphs, wherein the identified transition pattern indicates that a particular access point is underutilized due to an occlusion condition; and
use the identified transition pattern to effect a configuration change in the network that removes the occlusion condition.

9. The apparatus as in claim 8, wherein the apparatus uses the identified transition pattern to effect a configuration change in the network by:
providing an indication of the identified transition pattern to a user interface.

10. The apparatus as in claim 8, wherein the apparatus identifies the transition pattern from the client trajectories by deconstructing the trajectory subgraphs by:
performing frequent subgraph mining on the subgraphs, to identify the transition pattern.

11. The apparatus as in claim 8, wherein the apparatus identifies the transition pattern from the client trajectories by:
representing the edges of the subgraphs as entries in feature vectors for the trajectories; and
applying dictionary learning to the feature vector entries for the trajectories, to identify the transition pattern.

12. The apparatus as in claim 11, wherein the process when executed further comprises:
applying, by the device, a weighting to the feature vector entries to emphasize transitions of interest.

13. The apparatus as in claim 8, wherein the apparatus uses the identified transition pattern to effect a configuration change in the network by:
providing an indication of the identified transition pattern to a machine learning-based anomaly detector.

14. The apparatus as in claim 8, wherein an end of a trajectory corresponds to an access point transition by a client for which a subsequent access point transition is not observed within a predefined amount of time.

15. A tangible, non-transitory, computer-readable medium having software encoded thereon, the software when executed by a device configured to cause the device to perform a process comprising:
receiving, at the device, data regarding usage of access points in a network by a plurality of clients in the network;
maintaining, by the device, an access point graph based on the data regarding usage of access points, wherein the access point graph represents the access points in the network as vertices of the access point graph;
generating, by the device and for each of the plurality of clients, client trajectories as trajectory subgraphs of the access point graph, wherein a particular client trajectory for a particular client comprises a set of edges between a subset of the vertices of the access point graph and represents transitions between access points in the network performed by the particular client;

identifying, by the device, a transition pattern from the client trajectories by deconstructing the trajectory subgraphs, wherein the identified transition pattern indicates that a particular access point is underutilized due to an occlusion condition; and using, by the device, the identified transition pattern to effect a configuration change in the network that removes the occlusion condition.

16. The tangible, non-transitory, computer-readable medium as in claim 15, wherein the apparatus uses the identified transition pattern to effect a configuration change in the network by:

providing an indication of the identified transition pattern to a user interface.

17. The tangible, non-transitory, computer-readable medium as in claim 15, wherein the apparatus identifies the transition pattern from the client trajectories by deconstructing the trajectory subgraphs by:

performing frequent subgraph mining on the subgraphs, to identify the transition pattern.

18. The tangible, non-transitory, computer-readable medium as in claim 15, wherein the apparatus identifies the transition pattern from the client trajectories by:

representing the edges of the subgraphs as entries in feature vectors for the trajectories; and applying dictionary learning to the feature vector entries for the trajectories, to identify the transition pattern.

19. The tangible, non-transitory, computer-readable medium as in claim 18, wherein the process when executed further comprises:

applying, by the device, a weighting to the feature vector entries to emphasize transitions of interest.

20. The tangible, non-transitory, computer-readable medium as in claim 15, wherein the apparatus uses the identified transition pattern to effect a configuration change in the network by:

providing an indication of the identified transition pattern to a machine learning-based anomaly detector.

* * * * *

UNITED STATES PATENT AND TRADEMARK OFFICE
CERTIFICATE OF CORRECTION

PATENT NO. : 10,728,775 B2  
APPLICATION NO. : 16/406535  
DATED : July 28, 2020  
INVENTOR(S) : Savalle et al.

Page 1 of 1

It is certified that error appears in the above-identified patent and that said Letters Patent is hereby corrected as shown below:

In the Specification

Column 7, Line 54, please amend as shown:
AP1 through nth access point, APn) through which endpoint Column 8, Line 1, please amend as shown:
AP1 through nth access point, APn) through which endpoint Signed and Sealed this  
Twenty-fourth Day of November, 2020

Andrei Iancu  
*Director of the United States Patent and Trademark Office*